United States Patent [19]

Kocsányi et al.

[11] Patent Number: 4,865,492
[45] Date of Patent: Sep. 12, 1989

[54] ACTUATING DEVICE FOR PIPE-CHAMBER FEEDERS OF HYDRAULIC TRANSPORT EQUIPMENT

[75] Inventors: László Kocsányi; Károly Illes; László Ajtai, all of Budapest, Hungary

[73] Assignees: Kozponti Banyaszati Fejlesztesi Intezet; Heves Megyei Tanacsi Epitoipari Vallalat, both of Hungary

[21] Appl. No.: 72,242
[22] PCT Filed: Mar. 11, 1986
[86] PCT No.: PCT/HU86/00014
§ 371 Date: Jul. 1, 1987
§ 102(e) Date: Jul. 1, 1987
[87] PCT Pub. No.: WO87/05586
PCT Pub. Date: Sep. 24, 1987

[51] Int. Cl.⁴ ............................................. B65G 53/40
[52] U.S. Cl. .................................... 406/109; 406/192; 137/566; 138/26; 138/31
[58] Field of Search ...................... 406/93, 109, 45–48, 406/50, 85, 120, 123, 146, 183, 192, 195, 197; 137/566; 138/26, 30, 31; 414/217

[56] References Cited

U.S. PATENT DOCUMENTS

| | | | |
|---|---|---|---|
| 2,938,751 | 5/1960 | Nogami | 406/93 X |
| 3,560,053 | 2/1971 | Ortloff | 406/93 X |
| 4,029,362 | 6/1977 | Kortenbusch | 406/109 X |
| 4,082,367 | 4/1978 | Kocsanyi et al. | 406/50 |
| 4,371,294 | 2/1983 | Sakamoto | 406/192 X |

FOREIGN PATENT DOCUMENTS

| | | | |
|---|---|---|---|
| 194498 | 9/1986 | European Pat. Off. | 406/109 |
| 160526 | 8/1973 | Hungary . | |
| 44472 | 3/1980 | Japan | 426/109 |
| 12229 | 2/1981 | Japan | 406/109 |
| 113616 | 9/1981 | Japan | 406/93 |
| 114922 | 6/1986 | Japan | 406/192 |
| 551227 | 5/1977 | U.S.S.R. | 406/109 |
| 1197958 | 12/1985 | U.S.S.R. | 406/109 |
| 1224244 | 3/1971 | United Kingdom | 406/109 |

Primary Examiner—Joseph F. Peters, Jr.
Assistant Examiner—James M. Kannofsky
Attorney, Agent, or Firm—Handal & Morofsky

[57] ABSTRACT

The invention relates to an actuating device for pipe-chamber feeders of hydraulic transport equipment, the latter having main closing appliances, auxiliary closing appliances and a high-pressure pump. The novel feature is that a dashpot or other pressure storing unit is installed in a pressure equalizer pipe interconnecting the high-pressure pure-water pipe of the pump with the auxiliary closing appliances and in the dashpot the carrier liquid is in direct or indirect contact with a gas or air cushion.

20 Claims, 1 Drawing Sheet

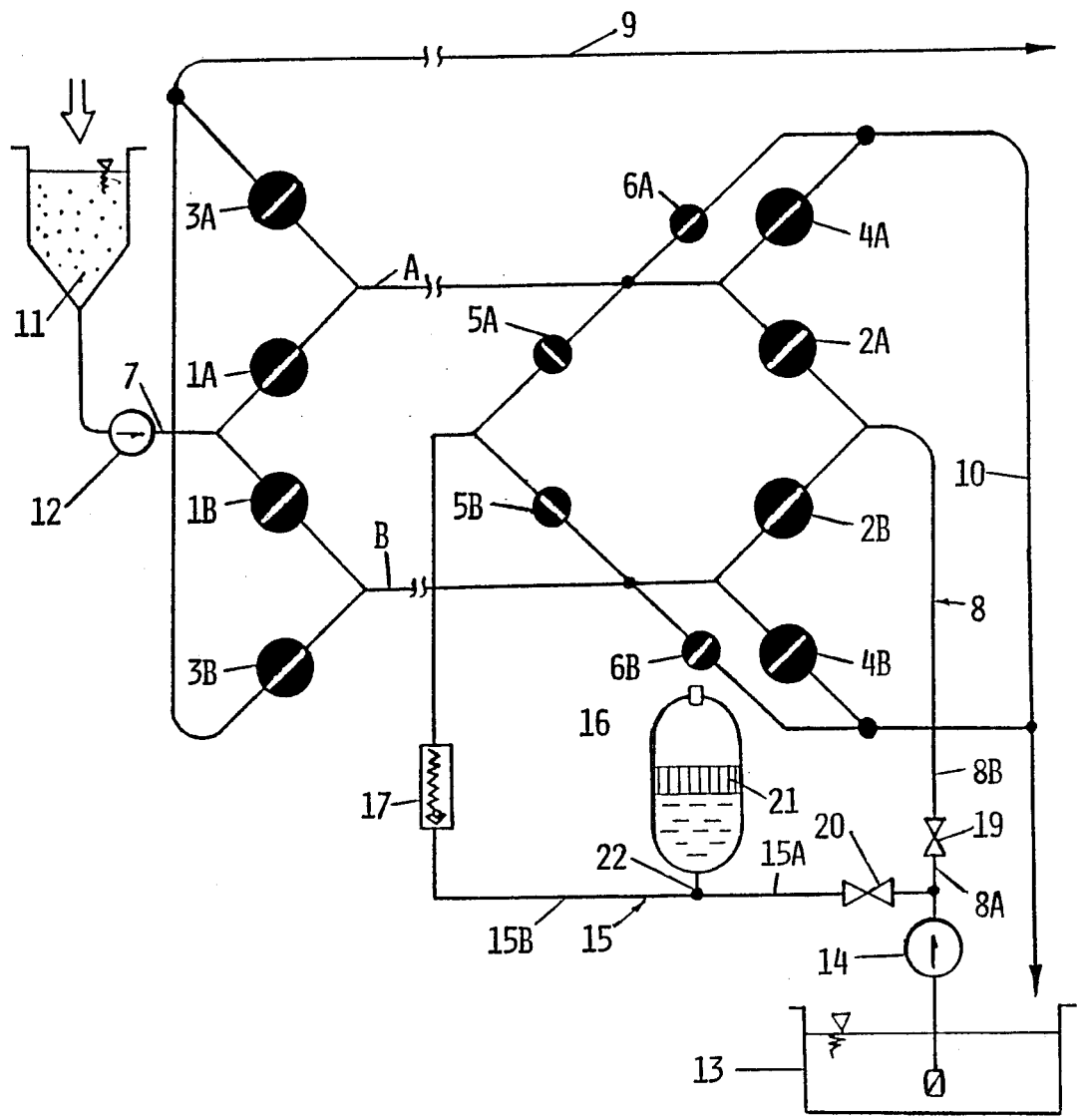

ACTUATING DEVICE FOR PIPE-CHAMBER FEEDERS OF HYDRAULIC TRANSPORT EQUIPMENT

FIELD OF INVENTION

The invention relates to an actuating device for pipe-chamber feeders of hydraulic transport equipment suitable for forwarding solid materials, e.g. coal or slag inform of a slurry, said equipment containing valves or other closing appliances. In practice such pipe-chambers are mostly of tubular shape.

BACKGROUND OF INVENTION

The function of a chamber (pipe-chamber) feeder consists of the periodical alternate filling of the chambers with slurry at low pressure and of emptying them at high pressure. While performing this function, the closing appliances, especially valves or sliding valves have to be opened and closed in a certain sequence and at short time periods. This can be most advantageously performed in a manner as it is described in the Hungarian Patent Specifications No. 160 526. If in any of the chambers the flow of slurry is stopped by closing the corresponding closing appliances, said chamber is then pressurized, which is relatively time-consuming when known prior-art equipment is used. For pressurizing, i.e. for increasing the pressure in a closed chamber, only a limited amount of the water flow delivered by the water pump can be used, the amount required would not cause considerable changes in either the quantity or the pressure of the water delivered by said pump.

From the aforementioned it becomes obvious that with traditional equipment a long-lasting time consuming changeover not only results from the slow motion of the closing appliances, but also from the fact that the above mentioned pressurizing of the pipechambers is rather time-consumptive with the result being the output of the equipment is considerably reduced. In addition, the pump transferring slurry from the slurry-tank into the pipe-chambers is prevented from working during the long changeover period so that if large quantities of slurry continuosuly arrive, solid matter may deposit in the slurry tank that can lead to serious breakdowns.

SUMMARY OF INVENTION

In order to eliminate the above and other deficiencies it seems to be advisable to reduce the time requirement of said changeover. In accordance with the present invention the desired reduction of time for changeover is achieved by shortening the duration of pressure equalizing. According to a basic idea that has led to the present invention it follows that if pressure is not equalized merely by a partial water-flow taken from the pressure pipe of the water pump during changeover, but for this purpose, entirely or at least partly, stored high-pressure water is used, pressurizing of the pipe-chambers can be performed very quickly, within a split of the time that has been needed up to now. In addition to this, it will no longer be necessary to suddenly take a large amount of water from the pressure pipe of the water pump in a short period of time, which would negatively influence the operation of the pump concerned.

Summing up the above, the essence of the invention lies in the application of a dashpot or any similar pressure storing unit arranged to the pressure equalizer pipe interconnecting the high-pressure pure-water pump of the filling pump with the auxiliary closing appliances, in such pressure storing unit the carrier liquid is subjected to the effect of a gas or air cushion. In such a new structure the water in the pressure storing unit will be re-pressurized in the intervals between two changeovers and such stored pressure can be applied to the pipe-chamber upon every changeover without any delay and within a very short time.

BRIEF DESCRIPTION OF THE DRAWINGS

One way of carrying out the invention is described in detail below with reference to drawings which illustrate only one specific embodiment of the invention and on which:

FIG. 1 is a schematic diagram of a two pipe-chamber feeder for hydraulic transport comprising the inventive actuating device.

DESCRIPTION OF A PREFERRED EMBODIMENT OF THE INVENTION

The invention will now be described in detail by way of example only, with reference to the accompanying drawing showing the schematic view of a feeder with two pipe-chambers, in which, when in operation, the feeder alternatively fills the pipe-chambers with slurry at low pressure and empties them at high pressure. Slurry is fed from a container 11 by a low-pressure slurry pump 12 via filling pipe 7 into one of the pipe-chambers, while the water having been left therein from the previous cycle of operation is displaced into a water emptying duct 10. Simultaneously, a pump 14 is pressing high-pressure pure water through a pure-water pipe 8 into the other pipe-chamber and expels the slurry, filled during the previous cycle, into a slurry pipe 9.

The operative steps of changeover are outlined only briefly below, as they correspond to the process of operation as described in the Hungarian Patent Specification No. 160,526 referred to above, and which is incorporated by reference.

In the initial working phase the pipe-chamber A is in the stage of filling, while pipe-chamber B is emptied. Filling and emptying are taking place simultaneously with the same time interval. This can be achieved by measuring and controlling the filling and discharging flow. Filling and discharge are performed at considerably different pressures; with the value of filling pressure not exceeding 2 to 5 bars, the pressure of discharge may reach 100 to 150 bars depending from the required distance and head of delivery.

Following the above initial operative phase a change-over is to be carried out in such a way that considerable changes of the pressure in the pipe-chambers will not result in pressure and velocity fluctuations, and thus, swingings or hydraulic impacts towards the delivery pipe and the high-pressure pump are avoided.

Changeover is carried out as follows:

(a) Closing appliances 1A, 4A and 6A are closed. In the filled pipe-chamber A the slurry stops flowing while in pipe-chamber B flow is not interrupted.

(b) Auxiliary appliance 5A is opened and simultaneously, the pump 14 applies pressure onto pipe-chamber A by means of the partial flow taken from its pressure pipe. Duration of the process is determined by the prerequisite that the partial flow that is taken through the flow cross-section cleared by the closing appliance 5A should be kept at such a low value that neither the quantity nor the pressure from the water-flow of pump 14 should change considerably.

(c) When pressure in pipe-chamber A reaches the required pressure level, the appliance 2A opens, the path of discharge water is cleared towards the pipe-chamber A, although the whole flow is passed through pipe-chamber B.

(d) The main closing appliance 3A opens while appliance 3B closes. Motion of the two main closing appliances is controlled so that the mutually opened cross-sections can be only larger but never smaller than that of one single appliance. Simultaneously, auxiliary closing appliance 5A closes.

(e) Appliances 2B and 5B are now closed, pipe-chamber B does not communicate any more with the high-pressure pure-water pipe 8.

(f) Auxiliary closing appliance 6B is opened, whereby the pipe-chamber B is relieved of pressure into the water emptying duct 10.

(g) Main closing appliances 1B and 4B are opened and filling of the pipe-chamber B begins.

The sequence of steps described above is then followed by the second phase of operation in the course of which pipe-chamber A is emptied and pipe-chamber b, is filled. A repeated changeover cycle occurs following the operational steps as specified above taking place in the same order of sequence, alternating with respect to the pipe-chamber that is being filled and the pipe-chamber being emptied.

The resulting duration of each of the changeovers occurring in the course of the regular working cycles is composed of the time required for the actuation of the closing appliances and of the time required for the change of pressure that takes place through the small-sized auxiliary appliances. A reduction of this latter period of time is of utmost importance, as previously mentioned. Accordingly, the main objects of the present invention are to reduce the durations of pressure canges (pressure equalization), and simultaneously to provide for the prolongation of the useful life of the water pumps of the equipment concerned. In order to achieve these, a pressure equalizer pipe 15 branching from the pure-water pipe 8 of the water pump 14 consists of a small-diameter part 15A and a large-diameter part 15B. From the boundary of said two parts a connecting duct 22, having the same diameter as the large-diameter part 15B, starts and it discharges into a dashpot 16.

Due to the fact that the part 15A is formed with a small diameter and it also contains a throttle-valve 20 being suitable for flowing quantity control, it can be achieved by properly adjusting the passing flow that the liquid quantity allowed to flow through said part 15A cannot considerably influence the liquid flow from the pump 14, even if no pressure prevails in the after-coupled liquid storing dashpot 16. The dashpot 16, a part of which is filled with air or gas, communicates with the auxiliary appliances 5A and 5B via a check valve 17. When in operation, during the closed position of said closing appliances, effective pressure in the dashpot 16 is built up via the throttle-valve 20. The dashpot 16 is so dimensioned that it is able to discharge the liquid quantity needed for the pressure equalization of the pipe-chambers very quickly and at a slight pressure drop, while the check-valve 17, the pressure equalized pipe 15, as well as auxiliary closing appliances 5A, 5B are dimensioned in such a way that they are able to deliver the pressure equalizing flow into the pipe-chambers in a very short time and without any significant pressure drop.

Accordingly, in course of the step b of the above specified changeover process, when one of the auxiliary closing appliances 5A and 5B is opened, pressure equilization in the pipe-chamber in question takes place very quickly. At the same time, this fast pressure equalizing procedure will appreciably not influence the quantity of pressure from the flow of the filling pump 14 and of the pure-water pipe 8, because, as previously mentioned, not even in a pressure relieved state of dashpot 16 could such a quantity of water be drawn off that would considerably change the quantity or pressure of the flow of the water pump 14. In such a manner harmful water impacts and swingings can be avoided, and in the course of chamber filling and emptying periods, being far longer than the changeover time, enough time is allowed for the dashpot to be recharged to normal working pressure.

By using the described method of pressure equilization, changeovers can be carried out with a steadier working pressure compared to the state achieved by applying the known prior art method according to the Hungarian Patent Specification No. 160,526. Compared to said method, a considerable saving of time is achieved through the use of the invention as described above.

In this embodiment, the dashpot 16 is made of metal and its piston 21 contacts on one side the water coming from the small, diameter-part 15A of pressure equalizer pipe 15, while on the other side there is an air, or gas, cushion. Liquid storage under pressure can also be realized without a piston, in a container with elastic lining or walls in a manner well known to those skilled in the field.

Part 15B, of pipe 15, has a large diameter, that means in view of the specification and the claims that its diameter is larger than that of the small-diameter part 15A. In practice, the ratio of diameters may lie in the range between 1:5 and 1:8.

Pressure and quantity of water delivered by pump 14 from water tank 13 are controlled by means of a slide valve 19. However, the procedure of regulation is unavoidably accompanied by a certain pressure drop; accordingly only a part 8A of the pure water pipe 8 is a full-pressure part, while the part after the slide valve 19 is a reduced-pressure part 8B. So it is considered as advantageous that the pressure equalized pipe 15 starts from the full-pressure part 8A of the pure water pipe 8.

We claim:

1. In an actuating device for hydraulic transport equipment utilizing pipe-chamber feeders, a low pressure slurry feed pump communicating with said pipe-chamber feeders, a slurry of solid material with water as the carrier fluid, a high pressure transport with an output a transport fluid, controlled with input and output closing appliances communicating with the pipe-chambers and a pressure equalizing pipe system between said transport pump's output and said pipe-chambers the improvement in combination therewith comprising a pressure storing unit containing an elastic storage means within said pressure equalizing pipe system, said elastic storage means acting on said carrier fluid and acted on by said transport fluid.

2. An improvement as claimed in claim 1, wherein said pressure storing unit comprises a dashpot in which the elastic means is a gas cushion.

3. An improvement as claimed in claim 2, wherein the improvement further comprises the use of at least two sizes of pipe in the pressure equalizing pipe system, the smaller diameter pipe connecting the output of said high pressure transport pump to a union joining larger diameter pipes connecting said dashpot and leading towards said pipe-chamber feeders.

4. A loading and driving system for pipe-chamber feeders of hydraulic transport equipment, said loading and driving system comprising:
   (a) a low pressure slurry pump;
   (b) at least two pipe-chambers;
   (c) at least two slurry admitting closing appliances, each positioned in a pipe connection between said slurry pump and one of said pipe-chambers;
   (d) a high pressure slurry output pipeline;
   (e) at least two high pressure output closing appliances, each positioned in a pipe connection between said high pressure slurry output pipeline and one of said pipechambers;
   (f) a high pressure carrier-fluid pump;
   (g) at least two carrier-fluid admitting closing appliances, each positioned in a pipe connection between said carrier-fluid pump and one of said pipe-chambers to permit said carrier-fluid pump to drive the contents of said pipe-chambers into said high pressure slurry output pipeline;
   (h) a carrier-fluid output pipeline;
   (i) at least two carrier-fluid output closing appliances each positioned in a first pipe system between said carrier-fluid output pipeline and one of said pipe-chambers to permit said slurry pump to drive the contents of said pipe-chambers into said carrier-fluid output pipeline; and
   (j) a pressure equalizing system connected to and acting between the pipe connection between said carrier fluid pump and said carrier fluid admitting closing appliances and said pipe-chambers comprising:
      (i) at least two auxiliary pressure input closing appliances; and
      (ii) a pressure storing unit comprising an elastic means for storing pressure produced by said high pressure carrier-fluid pump.

5. A loading and driving system as claimed in claim 4, wherein each of said auxiliary pressure input closing appliances are positioned in said pressure equalizing system between said pressure storing unit and one of said pipe-chambers.

6. A loading and driving system as claimed in claim 5 wherein said pressure equalizing system further comprises at least two auxiliary pressure-relieving closing appliances each positioned in a second pipe system between said carrier fluid output pipeline and each of said pipe-chambers.

7. A loading and driving system as claimed in claim 6, wherein said pressure storing system comprises a dashpot utilizing a gas cushion as said elastic means.

8. A loading and driving system as claimed in claim 6, wherein a control device is positioned in the pipe connection between said high pressure carrier-fluid pump and said carrier-fluid admitting closing appliances.

9. A loading and driving system as claimed in claim 8, wherein said pressure equalizing system is connected to the pipe connection between said high-pressure carrier-fluid pump and said control device.

10. A loading and driving system as claimed in claim 9, wherein said pressure equalizing system comprises a pipe connecting the pressure storage unit to the high pressure carrier-fluid pipe connection and piping between said pressure storage unit and the pipe-chambers wherein said piping connecting the pressure storage unit to the high pressure carrier-fluid pipe connection is of smaller diameter than the piping between said pressure storage unit and the pipe-chambers.

11. A loading and driving system as claimed in claim 10, wherein the piping diameter difference of the pressure equalizing system piping is within the range of 1 to 5 and 1 to 8.

12. A loading and driving system as claimed in claim 10, wherein said pressure equalizing system further comprises a check valve between said at least two auxiliary pressure input closing appliances and said pressure storing unit.

13. A loading and driving system as claimed in claim 10, wherein said pressure equalizing system further comprises a throttle valve positioned in the smaller diameter piping.

14. A loading and driving system as claimed in claim 4, wherein said pressure storing unit further comprises a piston separating said elastic means and said carrier-fluid.

15. A loading and driving system for pipe-chamber feeders of hydraulic transport equipment, said loading and driving system comprising:
   (a) a low pressure slurry pump;
   (b) at least two pipe-chambers;
   (c) at least two slurry admitting closing appliances, each positioned in a pipe connection between said slurry pump and one of said pipe-chambers;
   (d) a high pressure slurry output pipeline;
   (e) at least two high pressure output closing appliances, each positioned in a pipe connection between said high pressure slurry output pipeline and one of said pipe-chambers;
   (f) a high pressure carrier-fluid pump;
   (g) at least two carrier-fluid admitting closing appliances, each positioned in a pipe connection between said carrier-fluid pump and one of said pipe-chambers to permit said carrier-fluid pump to drive the contents of said pipe-chambers into said high pressure slurry output pipeline;
   (h) a carrier-fluid output pipeline;
   (i) at least two carrier-fluid output closing appliances each positioned in a first pipe system between said carrier-fluid output pipeline and one of said pipe-chambers to permit said slurry pump to drive the content of said pipe-chambers into said carrier-fluid output pipeline; and
   (j) a pressure equalizing system connected to and acting between the pipe connection between said carrier fluid pump and said carrier fluid admitting closing appliances and said pipe-chambers comprising:
      (i) at least two auxiliary pressure input closing appliances;
      (ii) a pressure storing unit comprising an elastic means for storing pressure produced by said high pressure carrier-fluid pump, wherein each of said auxiliary pressure input closing appliances are positioned in said pressure equalizing system between said pressure storing unit and one of said pipe-chambers, and
      (iii) a pipe connecting the pressure storage unit to the high pressure carrier-fluid pump connection and piping between said pressure storage unit and the pipe-chambers wherein said piping connecting the pressure storage unit to the high pressure carrier-fluid pipe connection is of smaller diameter than the piping between said pressure storage unit and the pipe-chambers.

16. A loading and driving system as claimed in claim 15, wherein said pressure storing system comprises a dashpot utilizing a gas cushion as said elastic means.

17. A loading and driving system as claimed in claim 15, wherein a control device is positioned in the pipe connection between said high pressure carrier-fluid pump and said carrier-fluid admitting closing appliances.

18. A loading and driving system as claimed in claim 17, wherein said pressure equalizing system is connected to the pipe connection between said high-pressure carrier-fluid pump and said control device.

19. A loading and driving system as claimed in claim 18, wherein said pressure equalizing system further comprises a check valve between said at least two auxiliary pressure input closing appliances and said pressure storing unit.

20. A loading and driving system as claimed in claim 19, wherein said pressure equalizing system further comprises a throttle valve positioned in the smaller diameter piping.

* * * * *